United States Patent [19]

Tominaga

[11] 4,185,831

[45] Jan. 29, 1980

[54] COMPOSITION FOR THE OUTER LAYER OF A GOLF BALL

[75] Inventor: Ichiro Tominaga, Kakogawa, Japan

[73] Assignee: Sumitomo Rubber Industries, Ltd., Hyogo, Japan

[21] Appl. No.: 930,678

[22] Filed: Aug. 3, 1978

[30] Foreign Application Priority Data

Aug. 16, 1977 [JP] Japan .................................. 52-98036

[51] Int. Cl.² ................................................ C08F 8/08
[52] U.S. Cl. .............................. 273/235 R; 260/42.29; 525/329; 525/359; 525/361; 525/363; 525/372; 525/373; 525/385
[58] Field of Search ............... 273/235 R; 526/55, 16, 526/46, 47.8, 48.3, 48.4; 260/42.29, 878 R

[56] References Cited

U.S. PATENT DOCUMENTS 3,940,146  2/1976  Little ................................ 273/235 R

FOREIGN PATENT DOCUMENTS 1402272  8/1975  United Kingdom ................ 273/235 R
1411843  10/1975  United Kingdom ....................... 526/55

*Primary Examiner*—William F. Hamrock
*Attorney, Agent, or Firm*—Birch, Stewart, Kolasch and Birch

[57] ABSTRACT

This invention is directed to a composition for use as a material for the outer layer of a golf ball, which composition is produced by the reaction of an ionomer resin with a monoepoxy compound. The golf ball having the outer layer of such composition can be driven for a long distance with a soft shot feeling.

10 Claims, No Drawings

COMPOSITION FOR THE OUTER LAYER OF A GOLF BALL

The present invention relates to improvements concerning a composition for use in a cover of a golf ball, and, more particularly, to improvements in a resin for use as a material for the outermost layer of a golf ball, said resin, referred to as an ionomer resin hereinbelow, being formed of a copolymer of ethylene or an α-olefin and an unsaturated carboxylic acid, which copolymer has a metallic ion cross-linking.

Conventionally, the constructions of golf balls have been divided into two types, i.e., one being the so-called thread-wound ball comprising a core hard portion of round shape, a flexible thread wound around said core hard portion under the application of a tension of a certain extent, and an outer layer for covering said flexible thread, and the other being the so-called solid ball which consists of a core comprising an inner layer of uniform composition or a plurality of layers integrally formed of different compositions, and an outer layer for covering thereof. The present invention is directed to a composition for use in the outer layers of golf balls of both types as above-mentioned.

As to the characteristics of golf balls having the construction of either type in practical use, there are in general some fundamental factors about golf balls such as shot distance, separability from the club head, shot feeling, and so on in order to determine the quality of a golf ball, which are influenced by the nature thereof such as elasticity, hardness, etc., depending upon the construction of the golf ball itself including an inner core, which is the core of the gold ball wound by a flexible thread therearound in case of the so-called thread-wound ball or which is the core comprising the inner layer or layers in case of the so-called solid ball, and an outer layer covering thereof. Therefore, it is necessary to have in connection with the above-mentioned factors a sufficient property for the outer layer of the ball to enhance the quality thereof, whereby the golf ball can provide a good shot distance, separability from a club head, shot feeling, etc.

In addition thereto, the outer layer of a golf ball is required to be produced at low cost to have suitable molding properties such as melt flow index, softening point, bonding property, and so on. Therefore, the outermost layer of a golf ball is also required to have good molding properties during the manufacturing process so as to enhance the quality of the golf ball manufactured.

Accordingly, the composition for use as a material for the outermost layer of a golf ball should be selected from the viewpoint of two factors as above-mentioned, i.e., from a total estimation suitable for the required properties of a golf ball in practical use and for the required productivity of a golf ball in the formation process of the outermost layer.

Conventionally, as one of the materials suitable for use as the outermost layer of a golf ball to be obtained as a primary factor in the above-mentioned total estimation, some resins such as ionomer resins have been widely employed in the industries of this field. It is well known that an ionomer resin has the properties of an excellent toughness, suitable elasticity and flexibility. In addition thereto, ionomer resins are superior in resistance to such matters as cold, abrasion, chemicals, etc., whereby a golf ball having the outer layer made of an ionomer resin is suitable for obtaining a good shot distance, separability from a club head, shot feeling, and so on. Furthermore, the formation of the outer layer of a golf ball from an ionomer resin can be easily achieved, because the ion cross-linkage contained in the copolymer of the ionomer resin may be automatically cut by heating the ionomer resin in the formation process so that the ionomer resin can flow smoothly within a mold to form the outer layer without trouble. The outer layer of the golf ball thus formed has the same properties as that of a plastic having a metallic ion cross-linkage, since the ion cross-linkage contained in the copolymer of an ionomer resin which has been cut may be restored under the disposition thereof in the ambient temperature. However, a golf ball covered with an ionomer resin layer always gives a click and a hard response to the hands of a player even when hit or batted with small force by a club. Since the number of golfers has been increasing in recent years and it has become required to give various shot feelings for golf balls such as a hard response or soft response to the hands depending upon the preference of the players, it is necessary to produce a golf ball which gives a good shot feeling, i.e., a soft response to the hands in addition to the good properties and productivity as a whole.

Therefore, it has been often proposed and tested to produce an improved golf ball covered with an ionomer resin layer of the above-described type by means of blending various types of ionomer resins having a different compositional ratio or cross-linkage density of copolymers or by blending the ionomer resin with various rubbers or plastic materials in order to obtain a golf ball having a good shot feeling, i.e., a soft response to the hands of the player.

However, up to the present, it has not been possible to produce a golf ball covered or coated with an ionomer resin layer which gives a soft shot feeling to players without deterioration of the excellent properties of ionomer resin.

Accordingly, it is an essential object of the present invention to provide a composition comprising an ionomer resin which is suitable as a material for use in the outermost layer of a golf ball while maintaining the excellent properties and good productivity thereof, which improves the quality of the golf ball so that the golf ball can be hit for a long distance and which gives a soft shot feeling to the players.

Another object of the present invention is to provide a composition of an ionomer resin with which the outer layer of the golf ball is easily produced at low cost without any trouble during the formation process.

The composition for the outer layer of a golf ball according to the present invention is produced in principle by the reaction of an ionomer resin with a mono-epoxy compound. The ionomer resin employed in the present invention is a chemical compound in the form of a copolymer including ethylene or an α-olefin and at least one unsaturated monocarboxylic acid having from three to eight carbon atoms, which copolymer has a thermo-modifiable metal cross-linkage in the structure thereof.

It is to be noted that the copolymer of ionomer resin may be either a random copolymer which is composed of various monomers, having a molecular chain for polymerization thereof, or a graft copolymer which is produced by the copolymerization of a molecular chain containing polyethylene with an unsaturated monocarboxylic acid monomer. The graft copolymer of this type is usually produced by the irradiation of a γ ray or ultraviolet beam light upon a mixture of polyethylene and an unsaturated monocarboxylic acid. In addition, the above-described copolymer can, if desired, include monomers such as an alkyl acrylate or an alkylmethacrylate and the like in a small amount, for example, in an amount of less than 10 weight percent. The α-olefin employed in the present invention is, for example, propylene, butylene, styrene, and the like, while the unsaturated monocarboxylic acid is, for example, acrylic acid, methacrylic acid, itaconic acid, crotonic acid, sorbic acid and the like.

The bonding agent for promoting the formation of a thermo-modifiable metal cross-linkage within the construction of the copolymer is selected from one of the metals such as sodium or potassium belonging to the metal group of Class Ia in the Periodic Table, strontium or barium belonging to the metal group of Class IIa, aluminum belonging to a metal group of Class IIIb and a metal oxide such as tin oxide, acetate, carbonate, or hydroxide belonging to the metal group of Class IV. Preferably, the bonding agent may be a metallic compound having a valence of 1 or 2, for example, sodium acetate, potassium acetate, calcium oxide, magnesium oxide, zinc oxide and the like. The bonding agent to be blended with the copolymer is utilized in an amount less than the theoretical amount necessary for the reaction thereof with all of the acid groups contained in the copolymer, which amount is generally less than 75% of the stoichiometric equivalent amount of the carboxylic acid, preferably, 15% to 60% thereof and, more preferably, 20% to 50% of the equivalent amount of the carboxylic acid.

The monoepoxy compound employed in the present invention has the following formula:

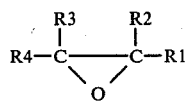

wherein R1, R2, R3 and R4 are selected respectively from hydrogen, halogen, a cycloalkyl group, a phenyl group, a phenyl derivative, an alkyl ether group, an alkenyl group, and an alkenyl derivative. More specifically, the monoepoxy compound employed in the present invention is ethylene oxide or a glycidyl ether having the formula:

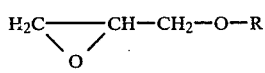

wherein R is alkyl, haloalkyl, alkenyl, cycloalkyl or phenyl.

Accordingly, the monoepoxy compound of the present invention is, for example, ethylene oxide, epichlorohydrin, aryl glycidyl ether, butyl glycidyl ether, cyclohexyl glycidyl ether, phenyl glycidyl ether, orthophenyl phenol glycidyl ether, and the like.

There are two methods for performing the reaction of the ionomer resin with the monoepoxy compound in accordance with the present invention, one in which the ionomer resin absorbs the monoepoxy compound after being heated to 90° to 95° C., and then heated to 100° to 140° C. for three to four hours, and the other wherein the ionomer resin is caused to swell in a solution of the monoepoxy compound in, for example, toluene, xylene and the like, and then heated to 100° to 140° C., whereby an ester is formed by the selective reaction of the monoepoxy compound with free carboxylic acid contained in the ionomer resin. However, it has been found that the ionomer resin treated by the above-mentioned methods maintains the superior physical properties as before the treatment thereof, since a portion of the ion-cross-linkage contained in the copolymer of ionomer resin remains therein. Moreover, the presence of an ion cluster phase, i.e., the formation of groups each assembled by certain sets of metallic cross-linkages in the copolymer of ionomer resin treated in the above-described method, is recognized not only by means of the infrared spectrum, i.e., IR spectrum at 1,550 $cm^{-1}$ absorption peak of the infrared spectrum, but also by means of the X-ray analysis at the angle $\theta$ of X-ray refraction of about $2\theta = 6°$. On the other hand, the reduction of the free carboxylic acid is recognized by a decrease of the absorbing capacity of the infrared spectrum, i.e., lowering of the strength of the absorption spectrum at 1,700 $cm^{-1}$, and the formation of ester is acknowledged by the appearance of the absorption spectrum at about 1,750 $cm^{-1}$.

It should be noted here that the composition to be used for the outer layer of a golf ball according to the present invention includes an impregnant or filler, which may be an active filler, i.e., an agent which acts both as a bonding agent for ion cross-linking and the filler, and is formed of zinc oxide, magnesium oxide and the like. If one of these active fillers is employed in the composition, the use of the bonding agent is not necessary.

The golf ball having the outer layer made of the composition of ionomer resin in accordance with the present invention manufactured as described above was proven to have a soft shot feeling without deterioration of properties such as being hit for a long distance, good separability from a club head, resistance to cracking, etc., which properties are inherent to the conventional ionomer resin-covered golf ball. Furthermore, since the ion cross-linkage remains in the ionomer resin after the reaction thereof with the monoepoxy compound takes place, the molding properties particular to the ionomer resin are not reduced, and the ionomer resin layer of the golf ball according to the present invention shows excellent releasability from a mold for the formation of the outer layer in the manufacturing process, and has the improved properties of an ionomer resin.

A better understanding of the present invention may be obtained from the following detailed description of several preferred examples thereof.

EXAMPLE 1

A proper amount of butyl glycidyl ether, which may be replaced by phenyl glycidyl ether, is added to the counterpart of Surlyn 1601 (which is a trade name of and sold by Du Pont of the U.S.A.) employed as an ionomer resin, and the resultant mixture is subsequently heated to 90° C. for two hours to allow the butyl glycidyl ether to be uniformly distributed therein, that is, mixed with the Surlyn 1601. The mixture of Surlyn 1601 and butyl glycidyl ether is then heated to 120° to 140° C. for three hours within a vulcanizer. The mixture thus heated is cooled to be rolled into a sheet having 0.5 m/m in thickness after being passed through a roll means. Subsequently, methanol is added to the sheet to extract the remaining butyl glycidyl ether, which has not been mixed with the Surlyn 1601, therefrom and then the sheet is dried. Finally, 2 PHR of titanium oxide is added to the sheet to obtain samples A, B, C, and D.

Samples G, H, I, J and K are obtained by the same procedure as mentioned above, but Surlyn 1650 (which is a trade name and sold by Du Pont of the U.S.A.) is used as an ionomer resin instead of the Surlyn 1601, and the mixture of Surlyn 1650 and butyl glycidyl ether is heated to 100° C. for three hours within a vulcanizer.

Sample E is obtained to be compared with the above-mentioned samples by the same process as mentioned above, but Surlyn 1855 (which is a trade name and sold by Du Pont of the U.S.A.) is employed as an ionomer resin of the soft type instead of Surlyn 1601.

Sample F is obtained by the employment of Balata as an ionomer resin of the soft type in place of Surlyn 1601, which composition is exposed to vapors of carbon disulfide for twenty four hours and, then heated to 40° C. for ninety six hours to be hardened in the absence of carbon disulfide.

The detailed data for the combination of compositions including an ionomer resin such as Surlyn 1601, 1650, 1855 and Balata with respect to the Samples A to K are shown in Table 1, and the real values of the principal physical properties of the Samples such as yielding point, modulus of elasticity, hardness, IR absorption, etc., are shown in Table 2.

Table 1

| Composition | Surlyn | | | | | | | | | | |
|---|---|---|---|---|---|---|---|---|---|---|---|
| | A | B | C | D | E | F | G | H | I | J | K |
| Surlyn 1601 | 100 | 100 | 100 | 100 | — | — | — | — | — | — | — |
| Surlyn 1855 | — | — | — | — | 100 | — | — | — | — | — | — |
| Surlyn 1650 | — | — | — | — | — | — | 100 | 100 | 100 | 100 | 100 |
| Balata | — | — | — | — | — | 60 | — | — | — | — | — |
| natural rubber (cis-1,4-polyisoprene) | — | — | — | — | — | 25 | — | — | — | — | — |
| Butyl glycidyl ether | | 10 | 5 | | | | | 4 | 6 | 8 | 10 |
| Phenyl glycidyl ether | | | | 10 | | | | | | | |
| Titanium oxide | 2 | 2 | 2 | 2 | 2 | 10.0 | 2 | 2 | 2 | 2 | 2 |
| Zinc oxide | — | — | — | — | — | 3.0 | — | — | — | — | — |
| Sulfur | | | | | | 1.0 | | | | | |
| Secondary amine | | | | | | 0.5 | | | | | |

Table 2

| | | A | B | C | D | E | F | G | H | I | J | K |
|---|---|---|---|---|---|---|---|---|---|---|---|---|
| | yield value | 132 | 57.7 | 90.0 | 73.4 | 73.2 | 63.2 | 149 | 95 | 85 | 75 | 66 |
| Modulus of elasticity | 100% | 136 | 74.8 | 110 | 88.8 | 89.6 | 66.2 | 164 | 114 | 100 | 90 | 79 |
| | 200% (kg/cm$^2$) | 147 | 78.4 | 122 | 95.2 | 105 | 83.1 | 173 | 133 | 112 | 104 | 90 |
| | 300% | 168 | 87.2 | 136 | 105 | 123 | 116 | 191 | 152 | 133 | 121 | 105 |
| TS (kg/cm$^2$) (tensile strength) | | 247 | 131 | 205 | 166 | 175 | 199 | 274 | 234 | 224 | 218 | 224 |
| EB (%) (elongation at break) | | 505 | 573 | 550 | 570 | 490 | 450 | 500 | 520 | 530 | 540 | 570 |
| hardness | | 71 | 58 | 63 | 60 | 62 | 57 | 72 | 65 | 63 | 60 | 58 |
| releasability* from mold | | X | O | Δ | O | X | O | X | O | O | O | O |
| MI(g/10 min.***) 190° C.) | | 1.98 | 2.86 | 2.08 | 3.87 | — | — | — | — | — | — | — |
| IR** | 1,550 cm$^{-1}$ | O | O | O | O | O | — | — | — | — | — | — |
| | 1,700 cm$^{-1}$ | O | X | O | X | O | — | — | — | — | — | — |
| | 1,750 cm$^{-1}$ | X | O | O | O | O | — | — | — | — | — | — |

*With respect to the releasability of the balls from the mold reducing, O represents the best releasability, Δ represents the second best releasability and X represents the worst releasability.
**With respect to the IR absorption band, O represents that the absorpton took place and X presents that no absorption took place.
***MI means melt-flow indexes according to ASTM D-1238-62T.

EXAMPLE 2

Table 3 shows a comparison of properties such as coefficient of restitution, durability, cut resistance, shot feeling and so on of different thread-wound balls having the outer layer made of the compositions of Samples A, B, C, D, and E in Table 1, the composition of Samples B, C, and D relating to the present invention, while Samples A and E are a reference model to be compared with the Samples of the present invention.

Table 3

| | A | B | C | D | E |
|---|---|---|---|---|---|
| Ball compression (core compression 48 on average) | 49 | 53 | 53 | 56 | 58 |
| (Fusion-bonding of buff powder onto the seam porton of balls) Spue Grinding Dust | no | no | no | no | yes* |
| Coefficient of Restitution/ head speed 49m/sec (compression 50) | 0.7046 | 0.7052 | | 0.6946 | |
| Durability (number of impulses to deform the | 250 | 200 | | 200 | 100 |

Table 3-continued

|  | A | B | C | D | E |
|---|---|---|---|---|---|
| ball by successively shotting the ball at 46m/sec Resistance to cracking (cut resistance) | good | good | good | good | good |
| Shot feeling driver | hard | Balata feeling | Balata feeling | Balata feeling | rather hard |
| putter | metallic sound | | | | rather metallic sound |

*The ball was frozen to −50° C. for three hours to buff the seam portion thereof. The buff powder was fused to be bonded to the seam portion and could not be removed therefrom.

It is clearly seen from Table 3 that, after the same portion of the Sample ball E is buffed with powder, the buff powder is fused to be bonded thereat over the entire area, which was impossible to remove therefrom. In contrast thereto, after the seam portion of the Sample balls A, B, C, and D are buffed with powder, the buff powder is not fused to be bonded to the seam portion of each of the Sample balls B, C, and D, through the modulus of elasticity thereof is equal to or less than that of the Sample ball E.

In Table 3, the durability of the ball is measured in terms of the impacts applied to the ball by sucessively hitting it at a speed of 46 m/sec until it becomes deformed. It will readily be seen from Table 3 that, since the number of impacts applied to the Sample balls B and D is twice that applied to the Sample ball E, the durability of the Sample balls B and D is double that of the Sample ball E., in spite of the similarity of the values of physical properties among them as shown in Table 2.

In either case of the tests conducted in Table 3 to determine resistance to cracking and durability of the Sample ball K having a mean value of 48 in the ball compression and the Sample ball E having a mean value of 58 in the ball compression, each ball is hit at the top and bottom portion thereof by a pitching wedge and then hit by a driver for 26 times.

The result of the tests is that the outer layer of the Sample ball E tended to be separated from the core thereof while separation of the outer layer from the core did not occur with the Sample ball K.

As clearly understood from the results of the tests, any one of the Sample balls B, C and D, each having the outer layer made in accordance with the composition of the present invention, always maintains excellent physical properties of the ionomer resin with respect to the coefficient of restitution, durability, and cut resistance and fusing of buff powder to the seam portion thereof, and generally gives players in practical use a soft hit feeling when shot a long distance as if the hitting force required were reduced as compared with that required in hitting the conventional golf ball. In fact, the sample balls of the present invention have the advantage which is not found in the reference ball E due to the improvement of the properties of the ionomer resin.

EXAMPLE 3

After pretreatments such as sand-blasting, flaming and so on, of balls having the outer layers made in accordance with compositions of Samples A and B of the present invention in Example 2, in preparation for coating with paint, the balls are coated about 20μ in thickness with a mixture of urethane paint having a polyester polyol for painting polyurethane in an amount of 100 parts by weight relative to the total weight of the resultant mixture, polyurethane setting agent in an amount of 130 parts by weight, ethyl acetate in an amount of 100 parts by weight, and titanium white in an amount of 50 parts by weight, and titanium white in an amount of 50 parts by weight. In painting the balls as described above, the polyester polyol is employed in the form of "Desumohen 120" which is a trade name owned by, and manufactured by, the Sumitomo Bayer Urethane, Ltd. of Japan, and the polyurethane setting agent is "Takeneto D110N" which is a trade name owned by, and sold by, the Takeda Chemical Industries Ltd. of Japan. The balls thus coated with a mixture of urethane paint are then dried at 40° C. for three days to perfect the coating process.

For testing the condition of the paint coated around the balls, the balls are immersed in a bath containing acetone at ambient temperature for two minutes.

The result of the above-mentioned tests is that the peripheral edge around each dimple on the outer layer of the ball having a composition of Sample A tends to be separated from the ball surface while there is found no such fission of the of peripheral edge from the ball having a composition of Sample B.

After the above tests, further friction pull tests are conducted wherein these balls A and B are immersed in a bath of water at ambient temperature for three days and then knocked against a plate which was inclined for 12° with respect to the plane positioned at right angles to the direction of the ball flying at a speed of 44 m/sec for fifty times in order to check the possibility of exfoliation of the coated paint from the ball.

The area of the outer layer of the ball B, whereat the paint was exfoliated is 60% of the area of one dimple, while that of the ball A is three times as large as the area of one dimple. These results prove a good adhesion property of the paint onto the outer layer made of the ionomer resin of the present invention.

Although the present invention has been fully described by way of examples, it is to be noted that various changes and modifications are apparent to those skilled in the art. Therefore, unless otherwise such changes and modifications depart from the scope of the present invention, they should be construed as being included therein.

What is claimed is:

1. In a golf ball comprising a core and an outer cover, the improvement wherein the outer cover is made from a composition which comprises the reaction product of (1) an ionomer resin comprising a copolymer of ethylene or an α-olefin and at least one unsaturated monocarboxylic acid having from 3 to 8 carbon atoms, said copolymer including thermo-modifiable metal cross-linkages therein, and (2) ethylene oxide or a monoepoxy compound having the formula:

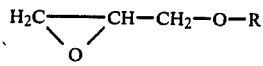

wherein R is alkyl, haloalkyl, alkenyl, cycloalkyl or phenyl.

2. A composition as claimed in claim 1, wherein said monoepoxy compound is selected from the group consisting of ethylene oxide, epichlorohydrin, allyl glycidyl ether, butyl glycidyl ether, cyclohexyl glycidyl ether, orthophenyl phenol glycidyl ether and phenyl glycidyl ether.

3. A composition as claimed in claim 1, wherein the reaction of the copolymer with ethylene oxide or the monoepoxy compound is performed in such a manner that the copolymer absorbs the ethylene oxide or monoepoxy compound after being heated to 90° to 95° C.

4. A composition as claimed in claim 1, wherein the reaction of the copolymer with ethylene oxide or the monoepoxy compound is performed in such a manner that the copolymer swells in a solution of the ethylene oxide or monoepoxy compound.

5. A composition as claimed in claim 1, further comprising a filler.

6. A composition as claimed in claim 5, wherein said filler comprises zinc oxide or magnesium oxide.

7. An outer layer for a golf ball having a composition comprising the reaction product of (1) an ionomer resin comprising a copolymer of ethylene or an α-olefin and at least one unsaturated monocarboxylic acid having from 3 to 8 carbon atoms, said copolymer including thermo-modifiable metal cross-linkages therein, and (2) ethylene oxide or a monoepoxy compound having the formula:

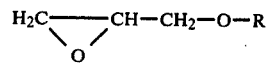

wherein R is alkyl, haloalkyl, alkenyl, cycloalkyl or phenyl.

8. A composition as claimed in claim 7, wherein said monoepoxy compound is selected from the group consisting of ethylene oxide, epichlorohydrin, allyl glycidyl ether, butyl glycidyl ether, cyclohexyl glycidyl ether and phenyl glycidyl ether, orthophenyl phenol glycidyl ether.

9. A composition as claimed in claim 7, further comprising a filler.

10. A composition as claimed in claim 9, wherein said filler comprises zinc oxide or magnesium oxide.

* * * * *